United States Patent
Srinivas et al.

(10) Patent No.: US 6,745,360 B1
(45) Date of Patent: Jun. 1, 2004

(54) METHOD AND SYSTEM FOR CONTROLLING THE RATE OF ACKNOWLEDGMENT OF COMMUNICATION PACKETS

(75) Inventors: Nk Srinivas, Issaquah, WA (US); Art Shelest, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/548,712

(22) Filed: Apr. 13, 2000

(51) Int. Cl.[7] .............................................. H04L 1/16
(52) U.S. Cl. ..................................................... 714/748
(58) Field of Search ................................. 714/748, 749

(56) References Cited

U.S. PATENT DOCUMENTS

| | | | | |
|---|---|---|---|---|
| 4,970,714 A | * | 11/1990 | Chen et al. | 370/216 |
| 5,416,779 A | * | 5/1995 | Barnes et al. | 370/280 |
| 5,694,391 A | * | 12/1997 | Diachina et al. | 370/346 |
| 5,727,002 A | * | 3/1998 | Miller et al. | 714/748 |
| 5,754,754 A | * | 5/1998 | Dudley et al. | 714/18 |
| 5,832,220 A | * | 11/1998 | Johnson et al. | 709/206 |
| 5,950,133 A | * | 9/1999 | Bledsoe | 455/439 |
| 5,970,063 A | * | 10/1999 | Chapman et al. | 370/346 |
| 5,983,265 A | * | 11/1999 | Martino, II | 709/206 |
| 6,078,570 A | * | 6/2000 | Czaja et al. | 370/331 |
| 6,128,283 A | * | 10/2000 | Sabaa et al. | 370/236 |
| 6,151,696 A | * | 11/2000 | Miller et al. | 714/748 |
| 6,249,681 B1 | * | 6/2001 | Virtanen | 455/466 |
| 6,263,001 B1 | * | 7/2001 | Banks | 370/522 |
| 6,370,151 B1 | * | 4/2002 | Bojanic | 370/426 |
| 6,389,016 B1 | * | 5/2002 | Sabaa et al. | 370/389 |
| 6,392,993 B1 | * | 5/2002 | Hamilton et al. | 370/230 |
| 6,438,603 B1 | * | 8/2002 | Ogus | 709/233 |

OTHER PUBLICATIONS

*X.25 Protocol Format*, STM&P 1997, available from www-.wanresources.com/x25cell.html [updated Feb. 1, 1998].

Allman, Mark, "On the Generation and Use of TCP Acknowledgments", *Computer Communication Review*, vol. 28, No. 9, pp 4–21, Oct. 1998.

Balakrishnan, Hari, "The Effects of Asymmetry on TCP Performance" *Mobile Networks and Applications 4 1999*, pp 210–241, Baltzer Science Publishers BV, 1999.

*Transmission Control Protocol DARPA Internet Program Protocol Specification*, RFC 793, Sep. 1981, available from www.shopthenet.net/publiclibrary/CIE/RFC/Orig/rec793.txt [accessed Jan. 31, 2000].

*Ongoing TCP Research Related to Satellites*, RFC 2760, Feb. 2000, available from www.ietf.org/frc/rfc2760.txt [accessed Feb. 1, 2001].

* cited by examiner

*Primary Examiner*—Stephen M. Baker
(74) *Attorney, Agent, or Firm*—Leydig, Voit & Mayer, Ltd.

(57) ABSTRACT

A method and system for controlling the rate of acknowledgment of communication packets is provided in which a sender determines whether or not an acknowledgment is required from a receiver, and if an acknowledgment is required, transmits a packet that is marked to indicate that an acknowledgment is required. There are many different ways in which a packet may be marked, including generating the packet so that it is shorter than a standard length, inserting an optional field, or inserting a value into the packet header. When TCP is being used for communication, the TCP segments may be marked by clearing the ACK bit of the TCP header. Two or more computers that are engaged in or about to engage in packet-based communication may also inform one another of their respective abilities to send and receive marked packets by transmitting capability packets to one another.

38 Claims, 7 Drawing Sheets

METHOD AND SYSTEM FOR CONTROLLING THE RATE OF ACKNOWLEDGMENT OF COMMUNICATION PACKETS

TECHNICAL FIELD

This invention relates generally to packet-based communication and, more particularly, to a method and system for controlling the rate of acknowledgment of communication packets.

BACKGROUND

Many of the packet-based communication protocols in use today require that a receiver of data transmit an acknowledgement to the other party after receiving a predetermined number of packets to insure that no portion of the data is lost. For example, the well-known transmission control protocol (TCP) requires a party to send an acknowledgement (ACK) back to a sender every time it receives two consecutive TCP segments. The rate at which a sending party actually needs to receive acknowledgments, however, may vary according to the nature and volume of the data traffic being experienced by each of the parties. But, as long as the communicating parties are forced to adhere to a pre-determined acknowledgement frequency, neither sender nor receiver has the opportunity to adjust the rate of acknowledgments. As a result many unnecessary acknowledgement messages may be generated and sent. Unnecessary acknowledgments significantly reduce the performance of wireless networks, which have limited bandwidth. In high speed network implementations such as gigabit Ethernet, the rate of unnecessary acknowledgments may be on the order of ten thousand. This represents a considerable waste of bandwidth and both systems' computing resources.

SUMMARY OF THE INVENTION

In accordance with the foregoing, a method and system for controlling the rate of acknowledgment of communication packets is provided. According to the method and system, a sender determines whether or not an acknowledgment is required from a receiver, and if an acknowledgment is required, the sender transmits a packet that is marked to indicate that an acknowledgment is required. There are many different ways in which a packet may be so marked, including generating the packet so that it is shorter than a predefined standard packet length, inserting an optional field, or inserting a value into the packet header. When TCP is being used for communication, the TCP segments may be marked by clearing the ACK bit of the TCP header. Two or more computers that are engaged in or about to engage in packet-based communication may also inform one another of their respective abilities to send and receive marked packets by transmitting capability information to one another.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
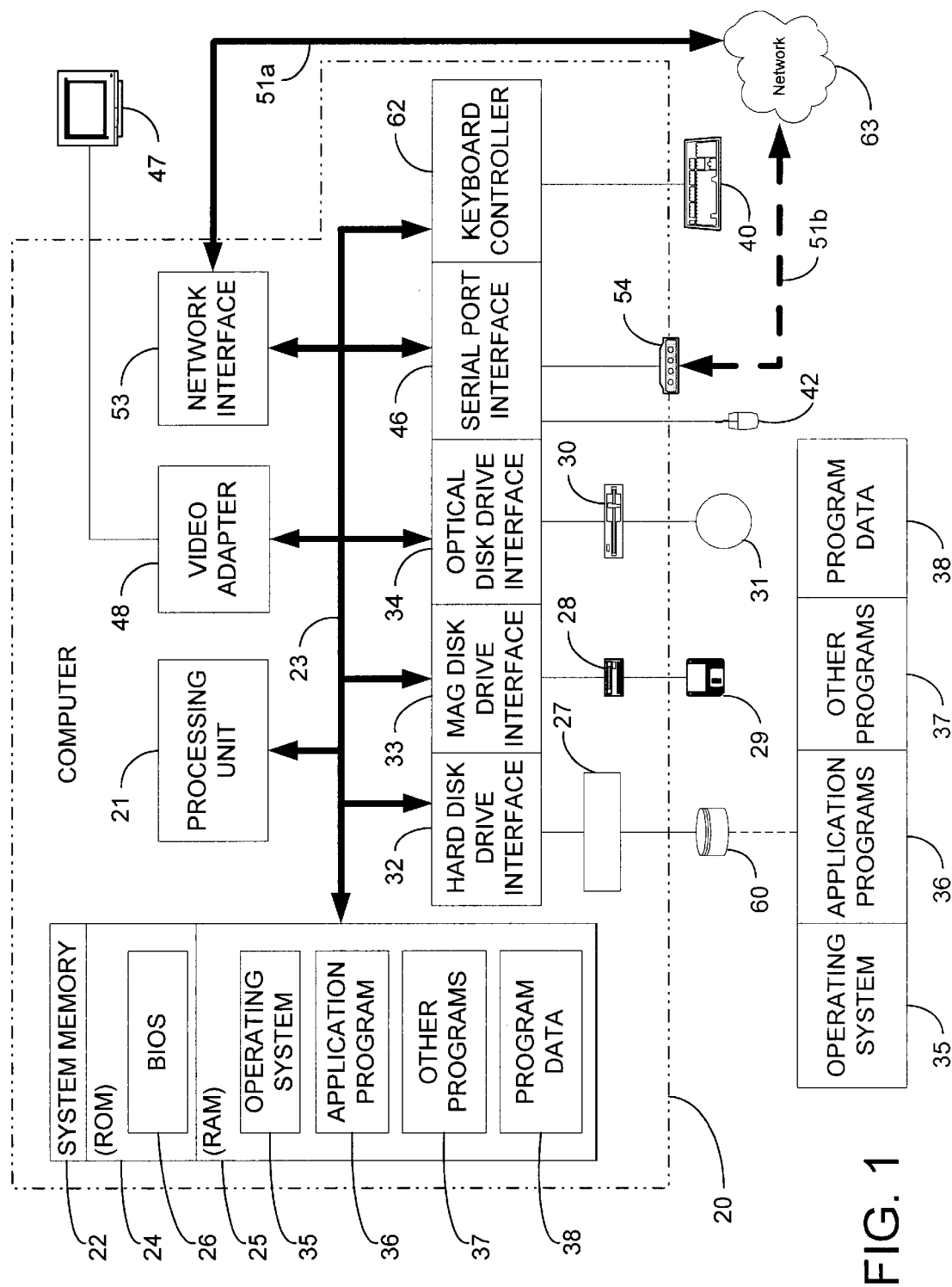
FIG. 1 is a block diagram generally illustrating an example computer environment in which the present invention may be used.

Turning to the drawings, wherein like reference numerals refer to like elements, an exemplary environment for implementing the invention is shown in FIG. 1. The environment includes a computer 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in the ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically include other peripheral output devices, not shown, such as speakers and printers.

The computer 20 may operate in a networked environment using logical connections to one or more devices within a network 63, including another computer, a server, a network PC, a peer device or other network node. These devices typically include many or all of the elements described above relative to the computer 20. The logical connections depicted in FIG. 1 include a land-based network link 51, for which there are many possible implementations, including a local area network (LAN) link and a wide area network (WAN) link. Land-based network links are commonplace in offices, enterprise-wide computer networks, intranets and the Internet and include such physical implementations as coaxial cable, twisted copper pairs, fiber optics, and the like. Data may transmitted over the network links 51 according to a variety of well-known transport standards, including Ethernet, SONET, DSL, T-1, and the like. When used in a LAN, the computer 20 is connected to the network 51 through a network interface card or adapter 53. When used in a WAN, the computer 20 typically includes a modem 54 or other means for establishing communications over the network link 51, as shown by the dashed line. The modem 54, which may be internal or external, is connected to the system bus 23 via the serial port interface 46. In a networked environment, programs depicted relative to the computer 20, or portions thereof, may be stored on other devices within the network 63.

Those skilled in the art will appreciate that the meaning of the term "computer" is not limited to a personal computer, but includes other microprocessor or microcontroller-based systems, such as hand-held devices, multi-processor systems, microprocessor based or programmable consumer electronics, network PCs, minicomputers, mainframe computers, Internet appliances, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will also be made to one or more programs executing on a computer system or being executed by parts of a CPU. A "program" is any instruction or set of instructions that can execute on a computer, including a process, procedure, function, executable code, dynamic-linked library (DLL), applet, native instruction, module, thread, or the like. A program may also include a commercial software application or product, which may itself include several programs. However, while the invention is being described in the context of software, it is not meant to be limiting as those of skill in the art will appreciate that various of the acts and operation described hereinafter may also be implemented in hardware.

The invention is generally directed to a method and system for controlling the acknowledgement rate of packet-based communication. According to a preferred embodiment of the invention, a party sending a data packet determines whether an acknowledgement is required from the party receiving the packet. If an acknowledgement is required, the sending party modifies the packet so as to make it distinguishable from packets for which acknowledgement is not required. This modification process will hereinafter be referred to as "marking" the packet, and packets that have been so modified will hereinafter be referred to as "marked" packets. There are many ways in which the sending party may mark a data packet. For example, the sending party can make the packet shorter or longer than a predefined standard packet length. The sender computer can also insert an identifier into the packet header, into the packet body, or into an optional field of the packet. When the invention is applied to TCP communication, however, it is preferred that the sending party mark a TCP segment by clearing the ACK bit of the TCP header.

Figure 2:
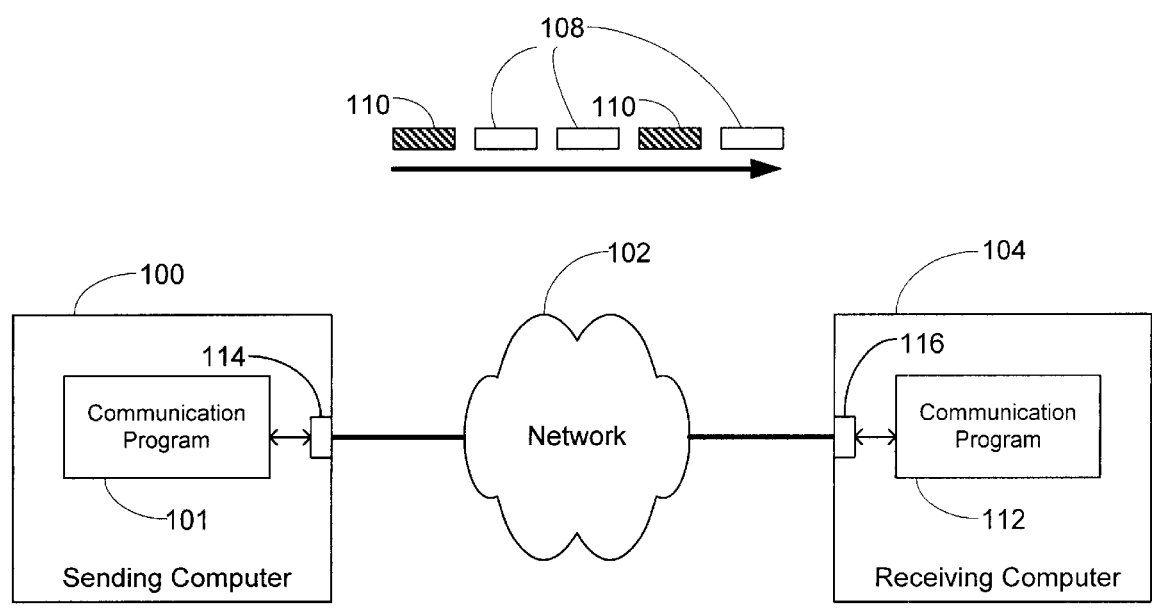
FIG. 2 is block diagram generally illustrating a basic packet communication scenario.

To illustrate how a preferred embodiment of the invention operates in a basic packet communication scenario, reference is made to FIG. 2. A communication program 101 executing on a sending computer 100 sends unmarked data packets 108 and marked data packets 110 through a socket 114, over a network 102, through a socket 116 and to a communication program 112 on a receiving computer 104. The communication program 112 receives each of the unmarked packets 108 without immediate acknowledgment, but generates an immediate ACK in response to the marked packets 110, or in response to a time-out condition.

Figure 3:
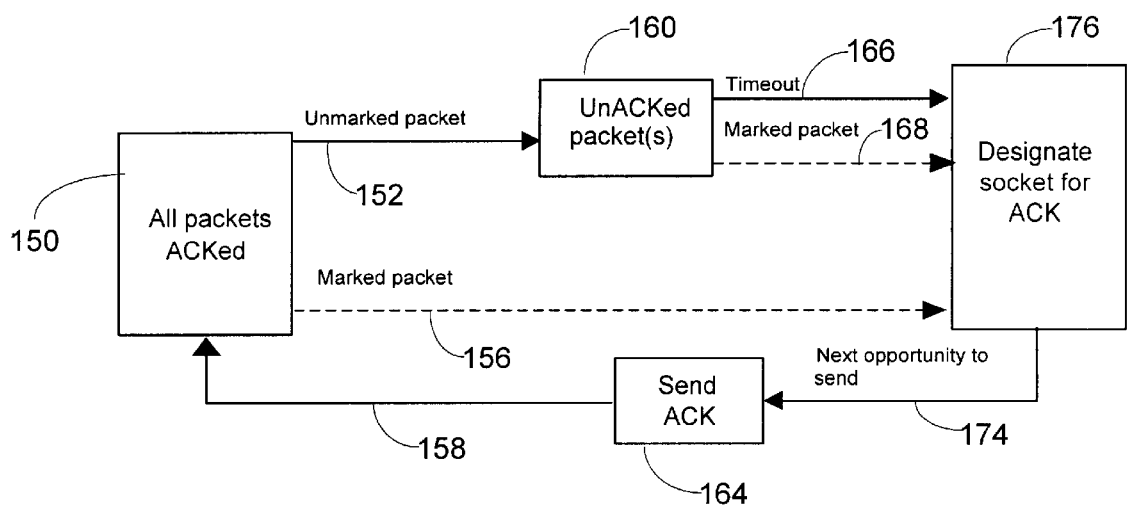
FIG. 3 is a state diagram generally illustrating the behavior of an example implementation of a communication program that can receive and interpret marked packets.

The state diagram of FIG. 3 depicts the behavior of one implementation of the communication program 112. It is assumed that the initial state of the communication program 112 is state 150, in which all packets have been ACK-ed. If the communication program 112 receives a marked packet 110, it changes along the arrow 156 to the state 176, in which the socket 116 is designated for an ACK. If the communication program receives an unmarked packet 108, it changes along the arrow 152 to state 160, in which thereare packets that have not been ACK-ed.

At state 160, the communication program 112 starts a timer. The timer may be of any duration, but is preferably from 100 to 200 milliseconds. If the communication program receives another unmarked packet before the timer expires, then the timer is started from the beginning, and the communication program remains in state 160. If the communication program 112 receives a marked packet 110, or if the timer expires, the program changes along the arrows 166 or 168 respectively to the state 176, in which the communication program designates that an ACK packet will be sent through the socket 116 at the next available opportunity. When the next opportunity to send a packet arrives, the communication program 112 changes to state 164, in which it sends an ACK packet destined for the communication program 101 through socket 116. After the ACK is sent, the communication program 112 returns to the state 150.

Figure 4:
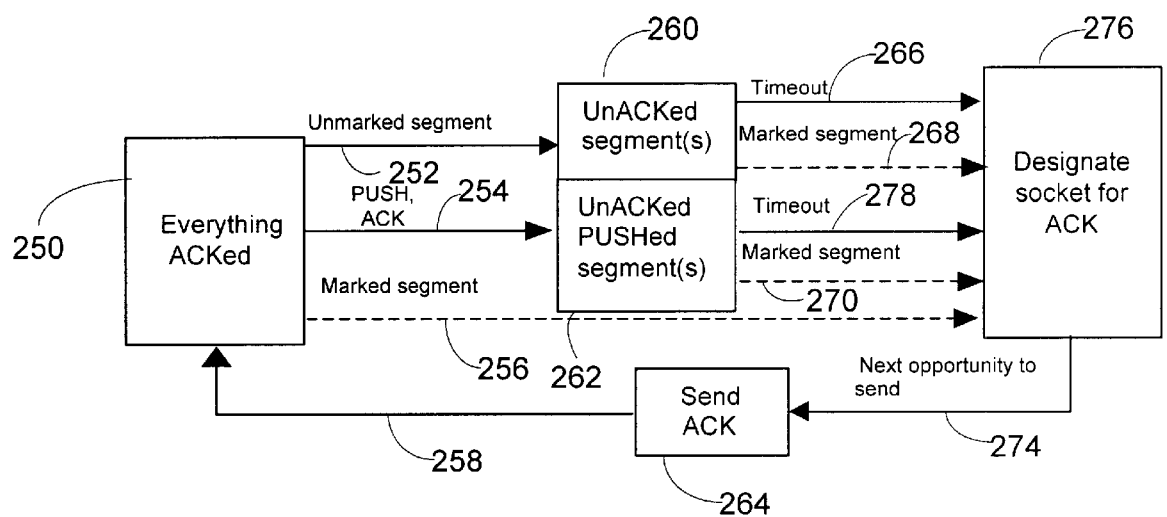
FIG. 4 is a state diagram generally illustrating the behavior of a more specific implementation of a communication program that can receive and interpret marked TCP segments.

The state diagram of FIG. 4 demonstrates a preferred embodiment of the communication program 112 that may be used for processing marked and unmarked TCP packets. In this embodiment, the communication program 112 preferably determines whether or not a TCP segment is marked by detecting the value of the ACK bit the TCP header. If the ACK bit is '1,' then the communication program 112 treats the TCP segment as unmarked and reacts accordingly (e.g. state change arrow 252). If the ACK bit is '0,' then the communication program 112 treats it as marked (e.g. state change arrows 268 and 170). In all other respects, the states 250, 260, 276, 264 and the arrows 252, 256, 266, 268, 272, 274 and 258 function the same as the states 150, 160, 176, and 164 and the arrows 152, 156, 166, 168, 172, 174 and 158 of FIG. 3.

The state diagram of FIG. 4, however, has an additional state 262 and three additional state changes represented by arrows 254, 270 and 278. These additions represent how the communication program 112 handles the use of the PSH or "push" bit of the TCP header. For example, if the communication program 112 is in the state 250 and the receiving computer 104 receives a TCP segment that is not marked, but has the push bit of its header set, the communication program 112 changes along the arrow 254 to the state 262, in which there are one or more unacknowledged TCP push segments. When the communication program enters the state 262, it starts a timeout count, which is preferably shorter than the count for the state change represented by the arrow 266. For example, if the normal timeout is 100–200 ms, then the push timeout may be 10 ms. The communication program 112 remains in this state until either the communication program 112 receives a marked TCP segment, or the timeout count expires, in which case the communication program 112 changes along arrow 278 or arrow 270 respectively to the state 276.

In another aspect of the invention, one or more computers engaged or preparing to engage in packet-based communication may inform one another as to whether they are capable of transmitting or receiving marked packets. This prevents a sending party from sending marked packets to a receiving party that is not capable of interpreting them. It also prevents a receiving party from expecting marked packets from a sending party that is not capable of generating them. The communicating parties may inform one another of their respective ability to send and receive marked packets at any point during communication, but, in a preferred embodiment, this informing process occurs during the handshaking phase.

Figure 5:
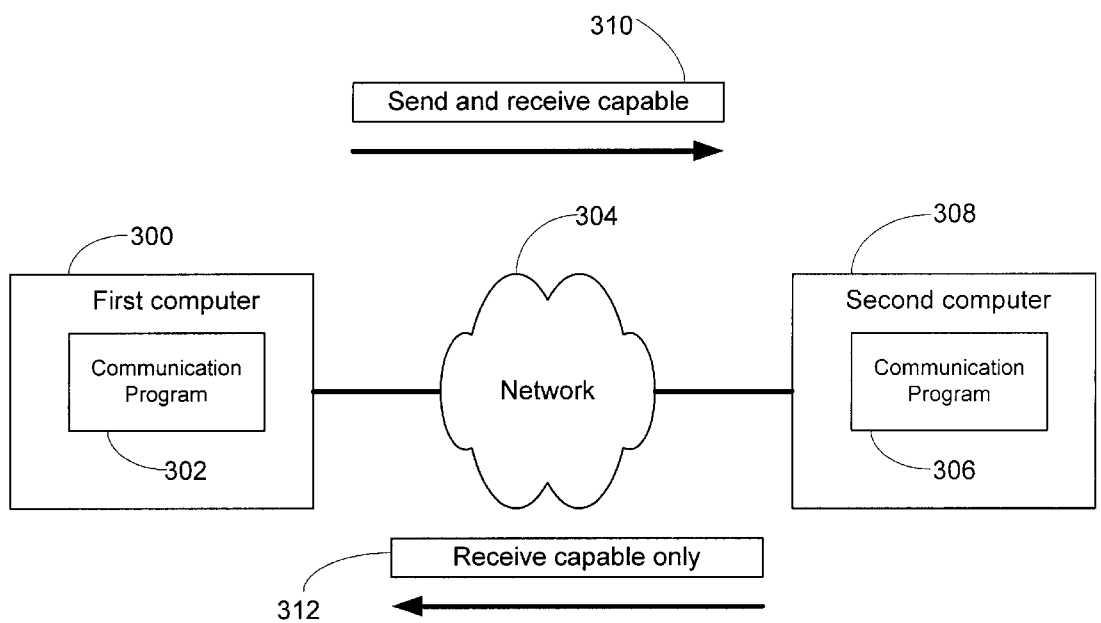
FIG. 5 is a block diagram generally illustrating an example of how two computers can inform one another of their respective abilities to send and receive marked packets.

By way of example with reference to FIG. 5, a communication program 302 executing on a first computer 300 is capable of both sending and receiving marked packets, while a second communication program 306 executing on a second computer 308 is capable of receiving marked packets but not of sending them. Thus, the communication program 302 should use marked data packets when sending to the communication program 306 but should not expect marked packets from the communication program 306. To inform one another of their respective abilities, the communication programs 302 and 306 may exchange capability information by sending packets 310 and 312 to one another. The packet 310 contains data representing the ability of the communication program 302 to send and receive marked packets, while the packet 312 contains equivalent data regarding the communication program 306. Those of ordinary skill in the art will appreciate that the data representing the respective abilities of the communication programs may be broken into multiple packets as well. For example, one packet may represent the ability of a computer to send marked packets, while a second packet may represent the ability of the computer to receive marked packets.

In a preferred embodiment of the invention, this data is a two-bit value in which bit 1 represents the send capability and bit 0 indicates the receive capability. Each communication program analyzes the capability information received from other program to determine whether it should send or receive marked packets. This analysis is performed by extracting the pair of bits from the received capability information, recalling the pair of bits sent out, reversing the order of the received pair of bits, and performing a logical AND operation on the two pairs. For example, the bit pair of the packet 310 would be "11"—indicating both send and receive capability, while the bit pair of the packet 312 would be "01." The communication program 302 would perform the operation "11 AND 10" and arrive at the result "10," indicating that the communication program will be a sender of marked packets but not a receiver. The communication program 306 would thus perform the operation "11 AND 01" and arrive at the result "01," indicating that the communication program 306 will be a receiver of marked packets but not a sender. If either party fails to transmit capability information, then the other party may react as if a "00" had been received.

Figure 6:
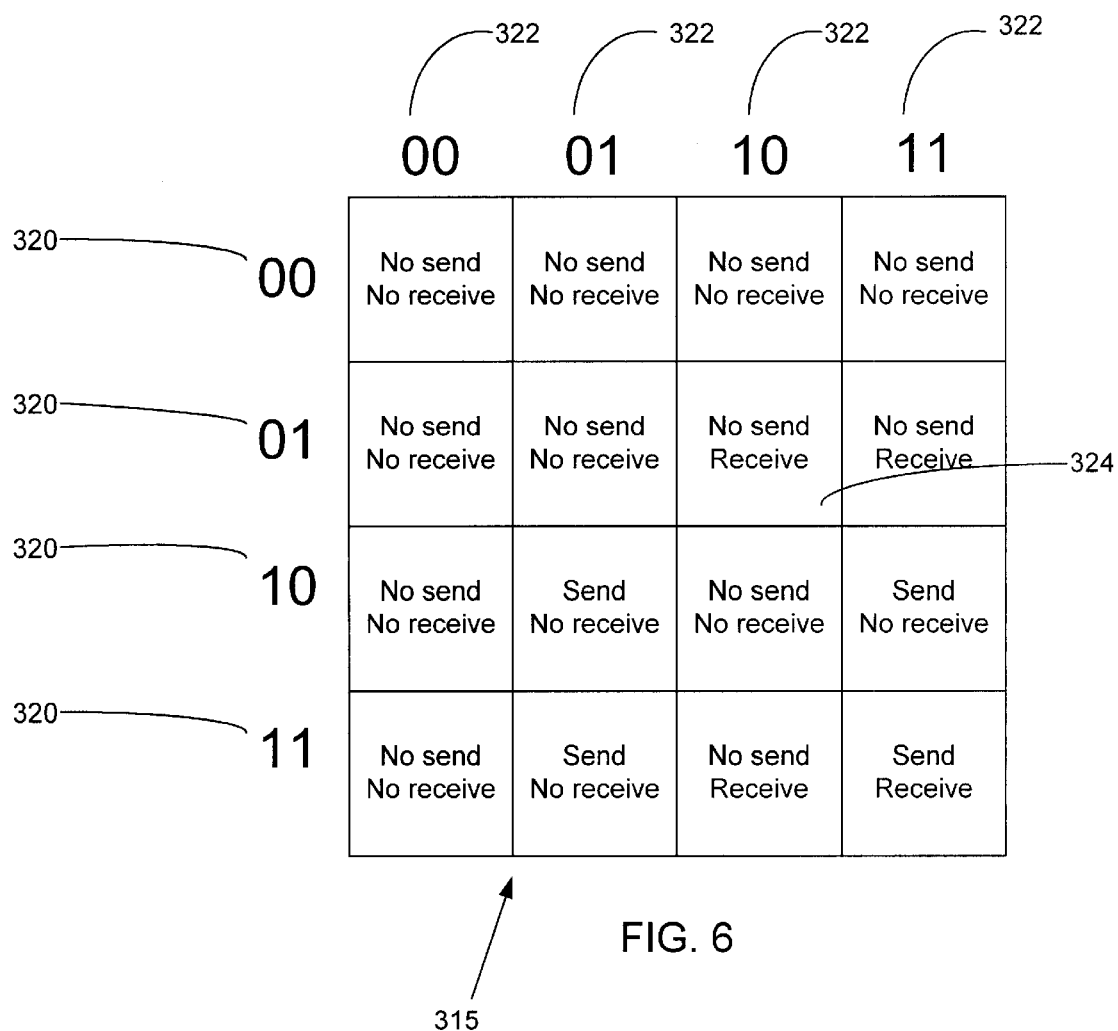
FIG. 6 is a matrix generally illustrating the possible outcomes according to an example exchange of capability information.

Referring to FIG. 6, a matrix 315 shows the possible results of such an AND operation. The rows 320 represents the two-bit value sent by a communication program while the columns 322 represent the two-bit value received from the other communication program. The entries in the matrix 315 show the resulting actions taken by the communication program after performing the logical AND. For example, the entry 324 is the result when a communication program sends the value "01" and receives the value "10." The result of "01" indicates that the communication program will not generate any marked packets but will expect to receive marked packets.

When the computers 300 and 308 are communicating using TCP, the data representing the respective ability of the communication programs to send and receive marked packets is preferably a two-bit code inserted into an optional field of the SYN segment or the SYN/ACK segment. For example, the communication program 302 could implement the packet 310 as a SYN segment with an optional field of the type "Capability" having a "11." Similarly, the communication program 306 could implement the packet 312 as a SYN/ACK packet with "Capability" field having a "01".

Figure 7:
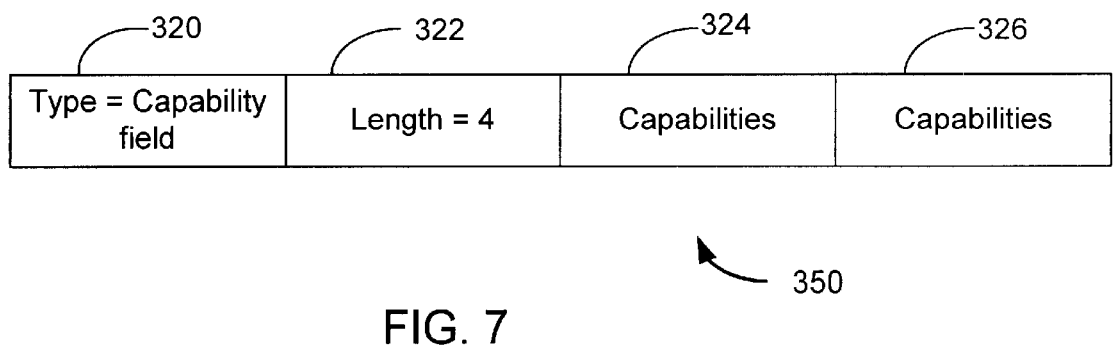
FIG. 7 generally illustrates the format of an example implementation of the an optional capability field.

Referring to FIG. 7 an example of how a "Capability" field, generally labeled 350, may be formatted is shown. A byte 320 contains a code identifying the field as an "Capability" option, while a byte 332 indicates the length of the field, which in this case is 4 bytes. Finally, bytes 324 and 326 contain various handshaking information as well as the aforementioned two-bit code. It will be appreciated by persons of ordinary skill in the art that the bits of the two-bit code do not have to be in any particular order, do not have to be next to one another, and do not have to be in any particular location of the "Capability" field 350, as long as the placement of the bits is recognizable to the computer receiving the packet containing the field 350.

Because current packet-based protocols require fixed-rate ACK generation, many computer programs relay on ACK generation to drive event loops. For example, if a program needs to perform a task after every sixth TCP segment is sent out, it can simply use the receipt of three TCP ACK segments as a triggering event. In the present invention, the rate of ACK generation may vary. Thus, it is preferred that programs synchronized with packet transmission use an alternative method of determining packet transmission, such as the well-known technique of byte counting.

The present invention may also allow computers to transmit larger bursts of packets then fixed ACK-rate schemes.

Thus, the use of burst control techniques may be desirable in networks that are unable to tolerate large packet bursts.

It can thus be seen that a new and useful method and system for controlling the rate of acknowledgment of communication packets has been described. In view of the many possible embodiments to which the principals of this invention may be applied, it should be recognized that the embodiments described herein with respect to the drawing figures is meant to be illustrative only and should not be taken as limiting the scope of the invention. It should also be recognized that the various steps involved in carrying out the methods described above as well as the specific implementation of each step described above may be changed in ways that will be apparent to those of skill in the art.

Finally, those of skill in the art will recognize that the elements of the illustrated embodiment shown in software may be implemented in hardware and vice versa, and that the illustrated embodiment can be modified in arrangement and detail without departing from the spirit of the invention. Therefore, the invention as described herein contemplates all such embodiments as may come within the scope of the following claims and equivalents thereof.

We claim:

1. A method of controlling the rate of acknowledgment of communication packets, the method comprising:

on a first computer, marking a communication packet to indicate that an acknowledgment is required in response to the packet, wherein marking the communication packet comprises creating the communication packet such that it is shorter than a standard packet length; and transmitting the marked packet to a second computer.

2. The method of claim 1, further comprising generating at least one communication packet, the at least one communication packet comprising data representing the ability to send marked packets.

3. A computer-readable medium having computer-executable instructions for implementing the method of claim 1.

4. A method of controlling the rate of acknowledgment of communication packets, the method comprising:

on a first computer, marking a communication packet to indicate that an acknowledgment is required in response to the packet, wherein marking the communication packet comprises inserting an optional field into the packet, the optional field indicating that an acknowledgment is required in response to the packet; and transmitting the marked packet to a second computer.

5. The method of claim 4, further comprising generating at least one communication packet, the at least one communication packet comprising data representing the ability to send marked packets.

6. A computer-readable medium having computer-executable instructions for implementing the method of claim 4.

7. A method of controlling the rate of acknowledgment of communication packets, the method comprising:

on a first computer, marking a communication packet to indicate that an acknowledgment is required in response to the packet, wherein marking the communication packet comprises clearing a bit in the header of the communication packet to indicate that an acknowledgment is required in response to the packet; and transmitting the marked packet to a second computer.

8. The method of claim 7, wherein the packet is a TCP segment, and the bit is the ACK bit of the TCP segment.

9. The method of claim 7, further comprising generating at least one communication packet, the at least one communication packet comprising data representing the ability to send marked packets.

10. A computer-readable medium having computer-executable instructions for implementing the method of claim 7.

11. A method of controlling the rate of acknowledgment of communication packets, the method comprising:

on a first computer, marking a communication packet to indicate that an acknowledgment is required in response to the packet;

transmitting the marked packet to a second computer;

on the first computer, generating at least one packet comprising data representing the ability of the first computer to send marked packets; and sending the at least one packet to the second computer.

12. The method of claim 11, wherein the generated packet further comprises data representing the ability of the first computer to receive marked packets.

13. The method of claim 11, wherein the generated packet is a TCP SYN segment, and wherein the data is contained in an optional field of the SYN segment.

14. The method of claim 11, wherein the generated packet is a TCP SYN/ACK segment, and wherein the data is contained in an optional field of the SYN/ACK segment.

15. The method of claim 11, wherein the generated packet is sent during a handshaking phase of communication between the first and second computer.

16. The method of claim 11, wherein the generated packet is generated by a communication program executing on the first computer.

17. The method of claim 11, wherein the data of the generated packet comprises a bit representing the ability of the first computer to send marked packets and a bit representing the ability of the first computer to receive marked packets.

18. The method of claim 17, wherein when the bits of the generated packet of the first computer are logically ANDed with the reordered bits of a packet generated by the second computer, the resulting value is indicative of whether the first computer should send marked packets and whether the first computer should expect to receive marked packets.

19. A computer-readable medium having computer-executable instructions for implementing the method of claim 11.

20. A method for determining whether to acknowledge a received communication packet, the method comprising:

determining whether the received packet is marked as requiring an acknowledgment, wherein determining whether the received packet is marked comprises determining whether the received packet is shorter than a standard packet length; and if the packet is marked, transmitting an acknowledgment to a sender of the packet.

21. The method of claim 20, further comprising generating at least one communication packet, the at least one communication packet comprising data representing the ability to receive marked packets.

22. A computer-readable medium having computer-executable instructions for implementing the method of claim 20.

23. A method for determining whether to acknowledge a received communication packet, the method comprising:

determining whether the received packet is marked as requiring an acknowledgment, wherein determining whether the received packet is marked comprises determining whether the received packet has an optional field indicating that an acknowledgment is required; and if the packet is marked, transmitting an acknowledgment to a sender of the packet.

24. The method of claim 23, further comprising generating at least one communication packet, the at least one communication packet comprising data representing the ability to receive marked packets.

25. A computer-readable medium having computer-executable instructions for implementing the method of claim 23.

26. A method for determining whether to acknowledge a received communication packet, the method comprising:

determining whether the received packet is marked as requiring an acknowledgment, wherein the received packet is a TCP segment, and wherein determining whether the received packet is marked comprises determining whether the ACK bit of the header of the TCP segment is cleared; and transmitting an acknowledgment to the sender of the TCP segment if the ACK bit is cleared.

27. The method of claim 26, further comprising generating at least one communication packet, the at least one communication packet comprising data representing the ability to receive marked packets.

28. A computer-readable medium having computer-executable instructions for implementing the method of claim 26.

29. A method of controlling the rate of acknowledgment of communication packets, the method comprising:

on a first computer, marking a communication packet to indicate that an acknowledgement is required in response to the packet, wherein marking the communication packet comprises assigning a value to a portion of the header of the communication packet, the value indicating that an acknowledgment is required in response to the packet;

transmitting the marked packet to a second computer; and generating at least one communication packet, the at least one communication packet comprising data representing the ability to send marked packets.

30. A computer-readable medium having computer-executable instructions for implementing the method of claim 29.

31. A method for determining whether to acknowledge a received communication packet, the method comprising:

determining whether the received packet is marked as requiring an acknowledgement, wherein determining whether the received packet is marked comprises determining whether the header of the received packet contains a value indicating that an acknowledgment is required;

if the packet is marked, transmitting an acknowledgment to a sender of the packet; and generating at least one communication packet, the at least one communication packet comprising data representing the ability to receive marked packets.

32. A computer-readable medium having computer-executable instructions for implementing the method of claim 31.

33. A retrofitted method of controlling the rate of acknowledgment of communication packets in an existing communications protocol, the method comprising:

on a first computer, marking a communication packet to indicate that an acknowledgment is required in response to the packet, wherein marking the communication packet comprises assigning a value to a portion of the header of the communication packet, the value indicating that an acknowledgment is required in response to the packet independent of what the portion of the header normally indicates in the existing communications protocol; and transmitting the marked packet to a second computer.

34. The method of claim 33, further comprising generating at least one communication packet, the at least one communication packet comprising data representing the ability to receive marked packets.

35. A computer-readable medium having computer-executable instructions for implementing the method of claim 33.

36. A method for determining whether to acknowledge a received communication packet, the method retrofitted to an existing communications protocol, the method comprising:

determining whether the received packet is marked as requiring an acknowledgment, wherein determining whether the received packet is marked comprises determining whether a portion of the header of the received packet contains a value indicating, independent of what the portion of the header normally indicates in the existing communications protocol, that an acknowledgment is required; and if the packet is marked, transmitting an acknowledgment to a sender of the packet.

37. The method of claim 36, further comprising generating at least one communication packet, the at least one communication packet comprising data representing the ability to receive marked packets.

38. A computer-readable medium having computer-executable instructions for implementing the method of claim 36.

* * * * *